United States Patent [19]

Davis

[11] Patent Number: 4,942,598

[45] Date of Patent: Jul. 17, 1990

[54] TELEPHONE ANSWERING MACHINE IN PAGING SYSTEMS WITH AUTOMATIC NUMBER IDENTIFICATION BASED MESSAGE OPERATIONS

[75] Inventor: Walter L. Davis, Coral Springs, Fla.

[73] Assignee: Motorola, Inc., Schaumburg, Ill.

[21] Appl. No.: 164,039

[22] Filed: Mar. 4, 1988

[51] Int. Cl.$^5$ .................. H04M 1/64; H04M 1/66; H04M 11/00

[52] U.S. Cl. .................. 379/57; 379/67; 379/142; 379/199; 379/211; 379/216; 340/825.44

[58] Field of Search .............. 379/57, 45, 142, 199, 379/211, 207, 214, 213, 67, 88, 246, 56, 51, 38; 340/825.44, 311.1

[56] References Cited

U.S. PATENT DOCUMENTS

| | | | |
|---|---|---|---|
| 4,263,480 | 4/1981 | Levine | 379/57 |
| 4,277,649 | 7/1981 | Sheinbein | 379/201 |
| 4,310,726 | 1/1982 | Asmuth | 379/207 |
| 4,611,094 | 9/1986 | Asmuth et al. | 379/211 X |
| 4,612,416 | 9/1986 | Emerson et al. | 379/88 |
| 4,640,991 | 2/1987 | Matthews et al. | 379/88 |
| 4,680,785 | 7/1987 | Akiyama et al. | 379/57 |
| 4,723,273 | 2/1988 | Diesel et al. | 379/211 |
| 4,763,191 | 8/1988 | Gordon et al. | 358/86 |

FOREIGN PATENT DOCUMENTS

| | | | |
|---|---|---|---|
| 0146167 | 8/1983 | Japan | 379/67 |
| 0090451 | 5/1984 | Japan | 379/89 |
| 0041358 | 3/1985 | Japan | 379/142 |
| 0229460 | 11/1985 | Japan | 379/67 |

Primary Examiner—Thomas W. Brown
Attorney, Agent, or Firm—William E. Zitelli; Vincent B. Ingrassia

[57] ABSTRACT

An automatic telephone answering device employing an Automatic Number Identification (ANI) decoder to selectively perform operations on a telephone call is described. The device may perform such operations as to selectively not respond, end, record or forward a telephone call wherein the selection is dependent upon the ANI signal associated with the telephone call, and the operations are determined prior to the reception of the telephone call. In using the automatic answering device in a paging system, a method of selectively forwarding a telephone message to a paging device and ultimately to a pager is described, wherein the selection is dependent upon the ANI signal associated with the telephone call. Additionally, a way to selectively distribute message storage between a telephone answering machine and a pager is described.

13 Claims, 6 Drawing Sheets

| SOURCE TELEPHONE NUMBER | OPERATIONAL SEQUENCE |
|---|---|
| SOURCE TELEPHONE NUMBER | OPERATIONAL SEQUENCE |
| ⋮ | ⋮ |
| SOURCE TELEPHONE NUMBER | OPERATIONAL SEQUENCE |
| REMAINING NUMBERS | OPERATIONAL SEQUENCE |

*FIG.3A*

| OPERATIONS | |
|---|---|
| | FROM ANI DECODER<br>CALL DETECT<br>SOURCE XXX-XXX-XXXX |
| TO ANSWERING DEVICE<br>ANSWER<br>END | FROM ANSWERING DEVICE<br>HANG UP DETECT |
| TO MESSAGE PLAYER<br>PLAY X | |
| TO SWITCH ONE<br>OPEN1/CLOSE1 | |
| TO TELEPHONE DIALER<br>DIAL XXX-XXX-XXXX | FROM TELEPHONE DIALER<br>BUSY<br>ANSWER<br>NO ANSWER |
| TO MESSAGE RECORDER AND<br>PLAYBACK DEVICE<br>RECORD<br>PLAYBACK | |
| TO SWITCH TWO<br>OPEN ALL/CLOSE N | |

*FIG.3B*

TELEPHONE ANSWERING MACHINE IN PAGING SYSTEMS WITH AUTOMATIC NUMBER IDENTIFICATION BASED MESSAGE OPERATIONS

FIELD OF THE INVENTION

This invention relates generally to the field of telephone message answering devices, and in particular, to telephone message answering devices with automatic number identification (ANI) capability. The ANI capability is used to selectively operate the answering device in response to an identified telephone message. This invention also relates to the field of selectively directing messages to paging devices in which the messages are received from a telephone network and the messages are selectively operated on and transmitted to a pager based upon the ANI signal.

BACKGROUND OF THE INVENTION

Telephone answering devices are well known and widely used as consumer products. These devices include the ability to answer a telephone call, play a predetermined message, and record a message from the telephone caller. There are many other additional features which are available. Some devices allow messages to be played back over the telephone network via remote command from the caller. Additionally, other telephone answering devices have the capability to dial a predetermined telephone number and play back a recorded message to that telephone number. Other telephone answering devices use a prerecorded voice message to request the caller to enter data over the telephone by using a 12-button keypad. This data is then stored and forwarded to a paging type transmitter and ultimately received and displayed by a paging receiver.

None of these answering machines has been capable of selectively operating on a message based on the source of the call, with the source of the call being determined by an ANI signal generated by the telephone network. Although some answering devices are capable of selectively performing operations, they do so only at the prompt of the caller. Thus, the caller must enter additional information to identify himself or the steps he desires the answering device to perform. In this implementation, it is the caller who controls the operation of the answering device. The prior art shows no solution for executing a variety of predetermined operation based on the source of the call without caller intervention.

New paging receivers will be capable of recording and storing voice messages. The messages are sent to the pagers in an analog form, then digitized by the pager and stored in a Random Access Memory (RAM) contained within the pager. An example of such a device may be found in U.S. patent application Ser. No. 07/06,682 to Bennett, et al. entitled "Digitized Stored Voice Paging Receiver" and assigned to the assignee of the present invention, which is hereby incorporated by reference. In general, the amount of RAM required to store voice message is large compared to the amount of RAM normally required by paging devices. This RAM is costly and draws large amounts of current, thereby increasing the cost and reducing the battery life of a pager. Therefore, it is desirable to limit the amount of RAM required by the pager and further to limit its use, thereby reducing the cost and current drain of the pager. This can be done by selectively forwarding messages to the pager based upon a selection made by a telephone answering device and that selection is based upon the source of the telephone call.

The U.S. telephone network is evolving, and the evolution is to an integrated services digital network (ISDN) system. The ISDN system addresses the telecommunications issues of the future and will allow high speed computer-to-computer interfacing and voice message services over the telephone network as well as several other services, all on a standardized protocol. The aspects of the ISDN proposed systems are too broad to be addressed in this application, but one important aspect of the system is the automatic number identification (ANI) that will be included with each telephone message. The ISDN system already in place in several areas sends an ANI signal indicative of the telephone number of the origin of the telephone call. Thus, when the ISDN system is operational nationwide, it will be possible to determine the source of the telephone call prior to answering the telephone call. Currently, such ANI signals are commonly used in PBX systems and within the existing telephone network to route calls and handle billing charges. ANI signalling is also widely used in the "911" emergency telephone system. However, at this time, these ANI signals are generally not available at the receiving telephone call. Implementation of the full ISDN network will make these ANI signals generally available to the receiving telephone and/or telephone answering devices.

SUMMARY OF THE INVENTION

It is therefore an object of the present invention to have a telephone answering device with the capability of decoding an ANI signal with further processing of a message based upon the decoded ANI signal. The several responsive operations of the telephone answering device may include terminating a telephone call, recording a telephone call, making a second connection on the telephone network to a second telephone number and forwarding the telephone call to the second telephone number, recording the call and playing the recorded telephone message back to a second telephone number, or connecting the telephone line to another device such as a personal computer or security system. In all cases, the selected operation will be made based upon the decoded ANI signal received with the telephone call.

It is a further object of the present invention to provide for a system and method of selectively forwarding telephone messages to paging receivers, the selection being based upon the ANI signal and made by a telephone answering device. The telephone answering device is additionally capable of recording a message and/or recording a message and forwarding it to a paging receiver. The telephone answering device is further capable of terminating the call or making a second connection over the telephone network to the pager for relaying the telephone message directly to the paging terminal and ultimately the pager.

It is yet an additional object of the present invention to provide for a system and method for distributing the recording of a telephone message between a telephone answering device and a paging device, wherein the distribution is based upon the received ANI signal within the telephone message.

DETAILED DESCRIPTION OF A PREFERRED EMBODIMENT

Figure 1:
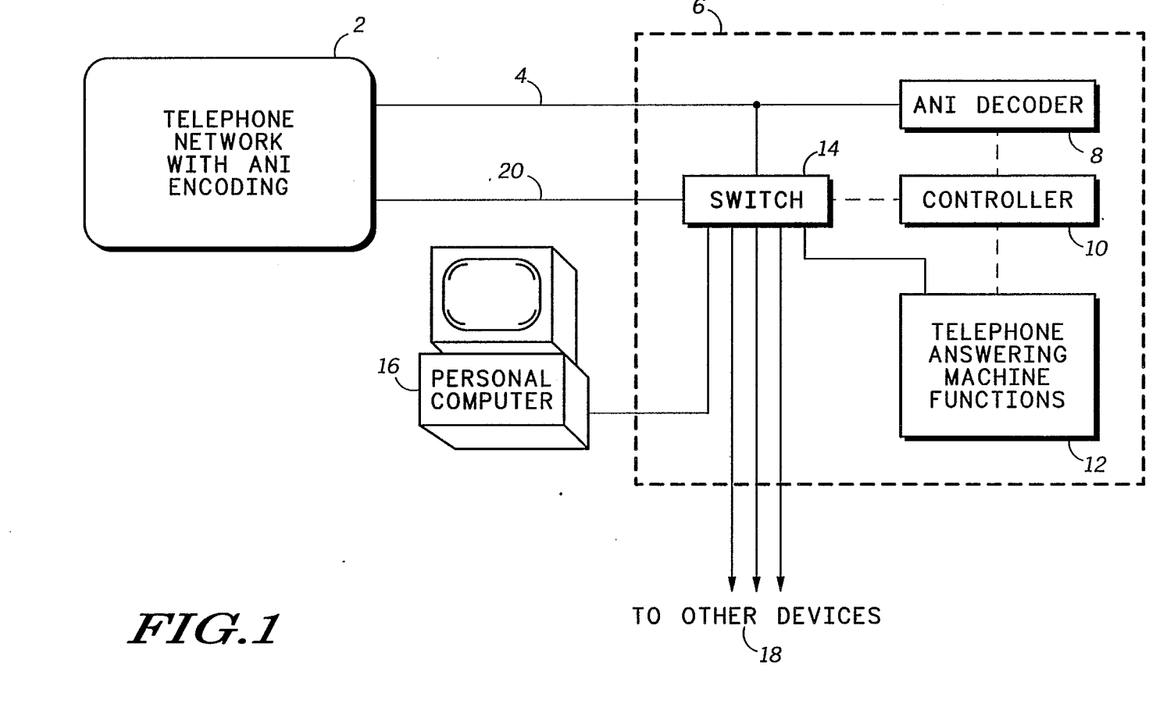
FIG. 1 is an overall block diagram of a system employing the invention.

FIG. 1 shows a telephone network with an ANI encoding capability 2. Such networks are well known to those familiar with the art and are in operation in several geographic areas in the United States. The telephone network transmits a telephone message from a calling telephone connected somewhere to the telephone network to a receiving telephone line 4. The ANI encoding is a function performed by the network which identifies the originating phone number of the message delivered to the received telephone line. ANI encoding is currently used in "911" information systems and many private PBX exchange systems. As previously stated, ANI will generally become available to receiving telephone lines with the advent of the nationwide ISDN system.

The receiving telephone line is connected to a telephone answering device 6 shown enclosed by a broken line. The telephone answering device is shown to comprise an ANI decoder 8, a controller 10, a block of telephone answering machine functions 12, and a switching means 14. The telephone answering device provides additional interface capability to external devices such as a personal computer 16 or other devices 18 which may be connected to a telephone line for information transfer. Other such devices may include items such as a paging terminal, a home security system, an energy monitoring device, and the like. Additionally, the telephone answering machine may connect back into network 2 through a second telephone line 20. The second telephone line allows the answering machine to make a second connection back to the telephone network for transferring the incoming call to a second predetermined phone number connected elsewhere to the telephone network.

Figure 2:
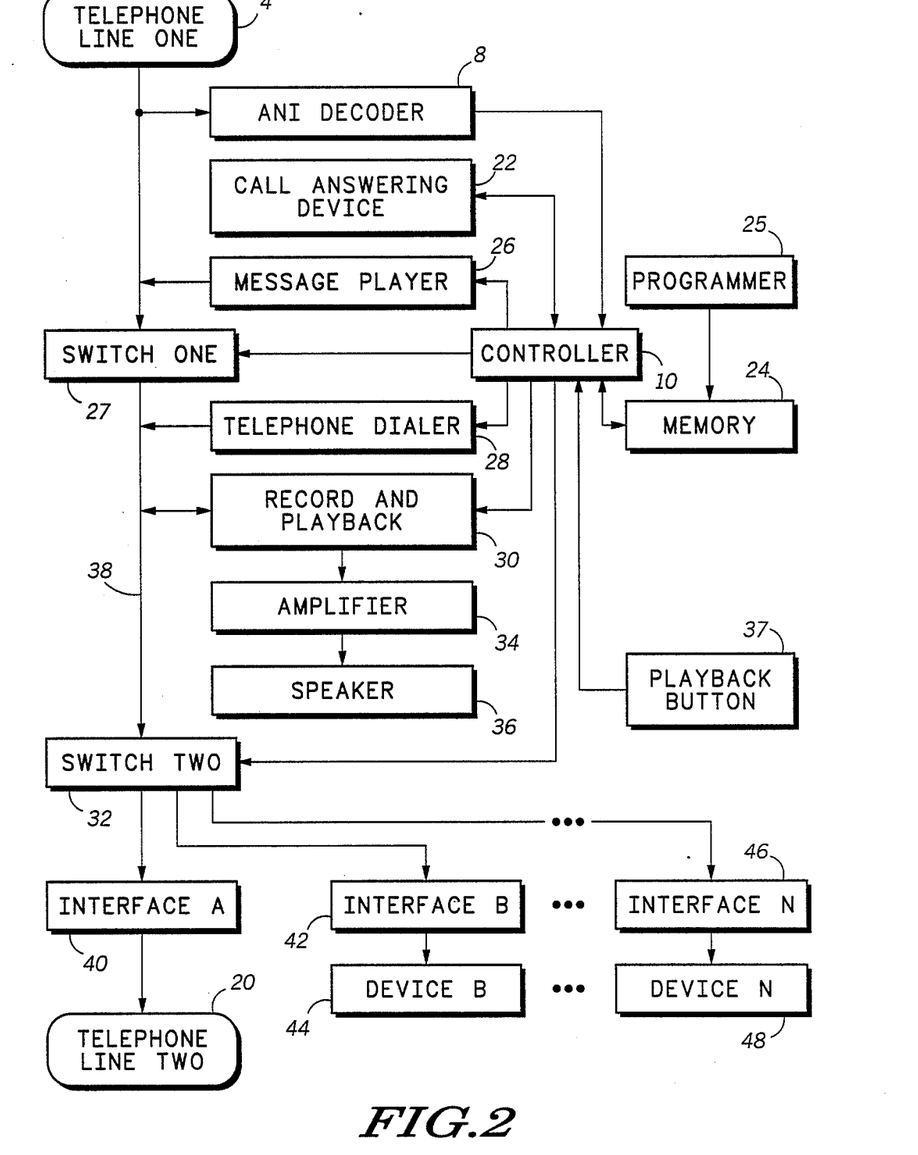
FIG. 2 is a detailed functional block diagram of a telephone answering device of the present invention.

Turning now to FIG. 2 which shows a detailed functional block diagram of telephone answering device 6, many of the functions of the telephone answering device 6 are well known to those familiar with the art. Telephone line one designated as 4 is used for receiving an incoming telephone call as well as an ANI signal generated by the telephone network. ANI decoder 8 decodes the ANI signal generated by the telephone network, thereby identifying the source telephone number of the calling telephone. Call answering device 22 is a circuit for accepting and ending a telephone call from the telephone network. Memory means 24 contains a table of predetermined source telephone numbers and corresponding operational sequences to be performed upon reception of a telephone call from that number. The contents of memory means 24 may be programmed by a programmer device 25 whose operation is not necessary for the description of this invention and is well known to those skilled in the art. Message player 26 contains a plurality of predetermined messages. A predetermined message is played on telephone line 4 in response to a signal from the controller. Construction of a message playing device capable of playing a plurality of messages are well known to those familiar with the art.

Controller 10 is typically a microprocessor-based controller. Any one of a number of microcomputers may be used in this application, but the preferable microcomputer is the MC68HC05C4 microcomputer manufactured by Motorola, Inc. One of the functions of the controller is to compare the source telephone number decoded by the ANI decoder 8 with the contents of the memory 24 and to determine the operational sequence to be performed by the telephone answering device. The controller acts to switch on or off various functions of the telephone answering device based upon the operational sequence.

Switch one designated as 27 is a switch that is opened or closed in response to a signal from controller 10. Switch 27 connects or disconnects telephone line 4 to an intermediate telephone line 38. The record and playback device 30 is used for recording a telephone message from the intermediate telephone line 38 and playing a telephone message back on the intermediate telephone line. Playback button 37 allows for the user activation of a playback of a recorded message by the answering device. Playback button 37 generates a signal to the controller in response to which the controller generates a signal causing the record and playback device to play back a message through audio amplifier 34 and speaker 36, allowing the message to be heard at the telephone answering device. Telephone dialer 28 dials telephone numbers recognized by the telephone network 2 in a manner well known to those familiar with the art, thus allowing the telephone answering device to place outgoing calls. The telephone dialer dials a phone number in response to a signal from controller 10.

Telephone switch two designated as 32 allows connection of several devices to the intermediate telephone line 38. Switch 32 allows the intermediate telephone line 38 to be connected through an interface A designated as 40, to a second telephone line 20. Switch 32 also allows connection through an interface B designated as 42 to a second device B designated as 44 interfaceable to the telephone line. Device 44 may be a personal computer for which interface B is a modem and the interface protocol is known as RS232. In such an event, the modem of interface B and personal computer of device 44 are well known to those familiar with the art. It can be appreciated that many kinds of devices may be connected to a telephone line. Consequently, there may be a number of N interfaces and devices may be connected. The Nth interface designated as 46 is the last interface and device N designated as 48 is the last device connectable to the telephone line.

It will be appreciated that with controller 10 taking input and output signals from the various devices and enabling and disabling these devices to and from a first or second or intermediate telephone line that the combination of the controller and the devices form a switching circuit, the switching circuit being responsive to the operational sequence contained within memory 24 and correspondingly the operational sequence is dependent upon the source telephone number contained within the received ANI signal.

Figure 3A:
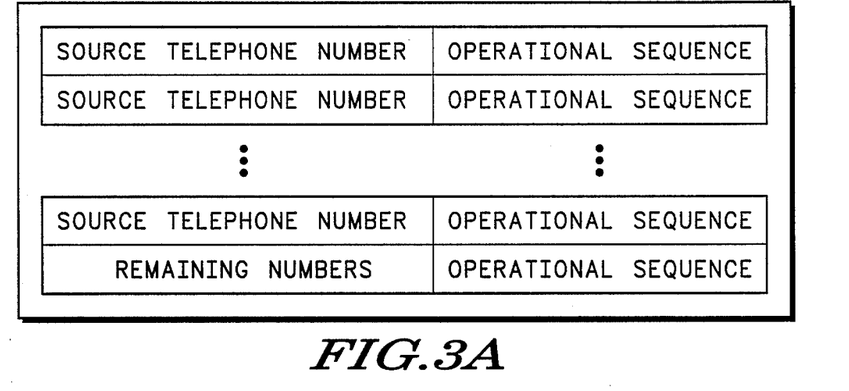
FIG. 3A is a diagram showing the contents of the memory means of the answering device of the present invention indicating that an operational sequence is dependent upon the source of the telephone call.

Turning now to FIG. 3A which shows the partial contents of memory 24, the memory arrangement shows a source telephone number and a corresponding operational sequence. The operational sequence comprises a sequence of steps to be performed upon receiving a call from a predetermined source telephone number. It can be appreciated that a large number of predetermined source telephone numbers may be stored in the memory means, each source telephone number possibly having a unique operational sequence. In operation, when a message is received and the ANI portion decoded, controller 10 accesses memory 24 to cause the correct corresponding operational sequence to be accessed for further processing of the message. Additionally, it is possible to specify a common operation for a group of source telephone numbers by specifying variable digits in the predetermined telephone number. An incoming telephone number need only match the predetermined digits and not the variable digits in the predetermined telephone number. It should be appreciated that the range of a variable digit may be specified. Additionally, an operational sequence for all source telephone numbers not particularly specified is shown.

Figure 3B:
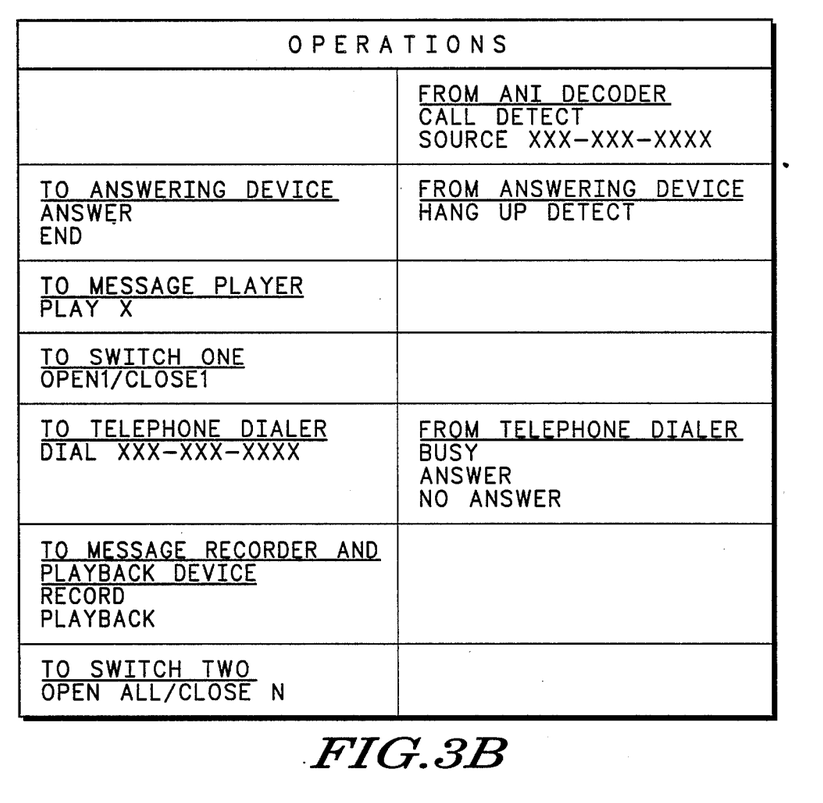
FIG. 3B is a table of operations formed by each of the functions of the preferred embodiment of the telephone answering device of the present invention.

FIG. 3B is a table showing the possible operations performed by each of the functions of the preferred embodiment for the answering device. Referring to FIG. 3B, each function may have an output signal to controller 10 or an input signal from controller 10 and these are described with the name and function. Many of the functions of the answering device are known and the following is a listing of the description of the several functions.

Output signals coming from the ANI decoder 8 to controller 10 are CALL DETECT and SOURCE. CALL DETECT indicates the presence of an incoming call and establishes decoding of the SOURCE of the ANI decoded signal. The SOURCE information contains the source telephone number of the calling telephone call.

An input signal to the call answering device 22 from controller 10 is ANSWER which causes device 22 to "answer" the telephone call. A second input signal END causes the answering device 22 to "end" the telephone call. An output signal from the answering device to the controller is HANG UP. The HANG UP signal indicates that the calling telephone has hung up.

The message player 26 has a PLAY X input signal from the controller 10 which commands the message player to play a predetermined message, X. Since the message player may contain a number of playable messages, a command to PLAY 3 would cause message player 26 play message 3 in its entirety.

Input signals to switch 27 from controller 10 are OPEN 1 and CLOSE 1. The signal OPEN 1 opens switch one, thereby isolating telephone line 4 from intermediate line 38. The signal CLOSE 1 closes switch one, thereby connecting telephone line 4 to intermediate line 38.

A signal from controller 10 to telephone dialer 28 is DIAL followed by a phone number. The phone number may be any sequence of digits necessary to dial a predetermined phone number. Telephone dialer 28 has three output signals to the controller which detects, after the telephone number was dialed, if the telephone is BUSY, if the telephone is ANSWERED, or if the telephone is not answered within a predetermined time, NO ANSWER signal. The controller uses these outputs as conditions for subsequent operational sequences.

The record and playback device 30 accepts a RECORD signal and a PLAYBACK signal from controller 10. The RECORD signal causes the record and playback device to record messages from the intermediate telephone line 38. The PLAYBACK command instructs the recorder and playback device to play back a recorded message on intermediate telephone line 38.

Switch 32 acts as a single pole multiple throw switch having N positions. A signal from controller 10 indicates which of the N devices to connect to intermediate line 38. A second signal instructs switch two to open the connection between line 38 and any of the interface devices currently connected. The operation of switch 32 combined with switch 27 allows any of the telephone interfaceable devices 20, 44 or 48 to interface with answering machine functions 8, 22, 26, 28, or 30 under control of controller 10. Additionally, through the operation of switch 32 and switch 27, telephone line may be ultimately connected to telephone line 20, allowing direct transfer of a telephone message, or telephone line 4 may be ultimately interfaceable to device 44 or 48 under control of controller 10 for communication with that device.

Figure 4A:
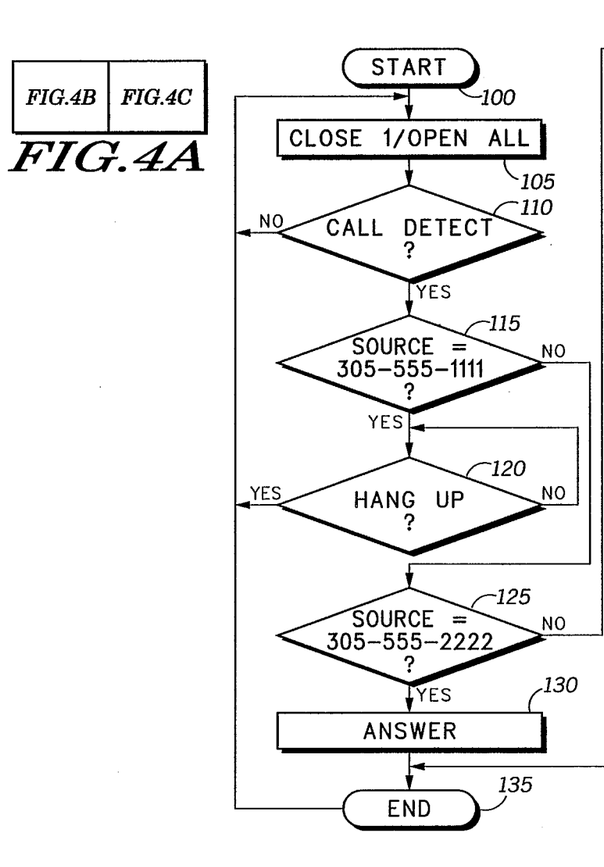
FIGS. 4A, 4B and 4C, in combination, depict operational sequences of the telephone answering device of the present invention based upon the decoded source of the telephone call.
Figure 4B:
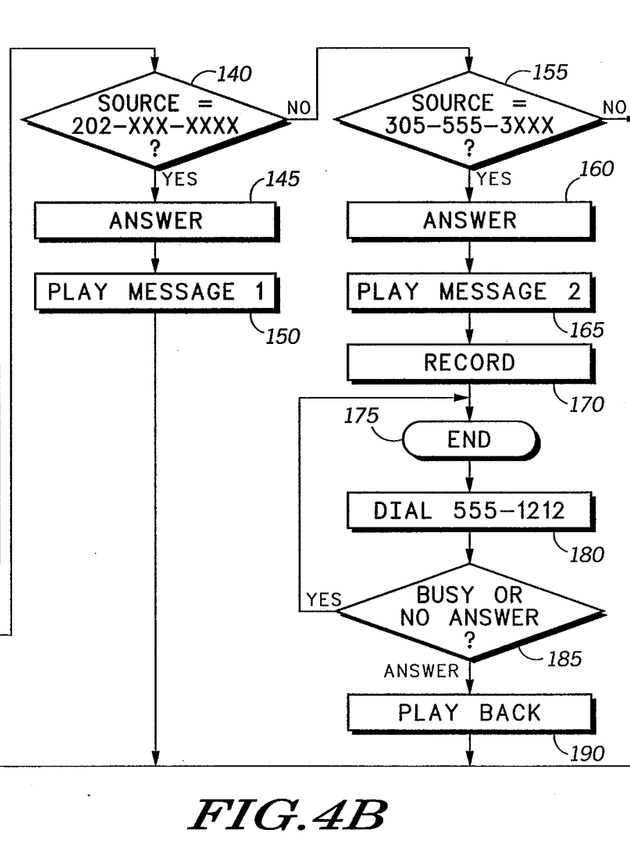
Figure 4C:
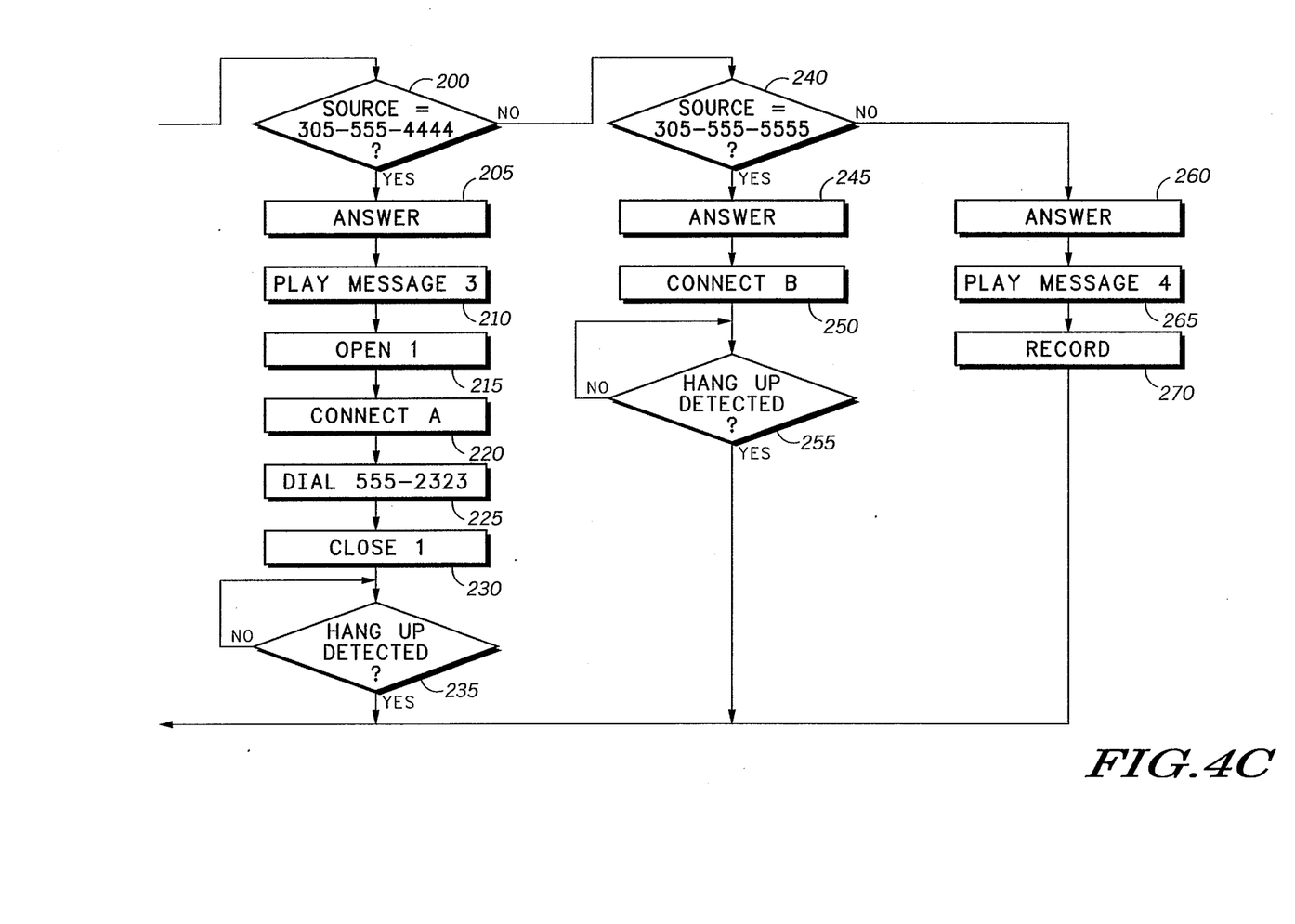

Turning now to FIGS. 4B and 4C which in combination, depict a flow chart showing possible operational sequences of the telephone answering device, this flow chart may be implemented in microcode contained in the program ROM of controller 10. The program enters at a start location 100 which initializes the microcomputer and I/O functions necessary to run the answering machine. These operations are well known to those familiar with the art. Step 105 includes CLOSE 1 which connects telephone line 4 to intermediate line 38 and OPEN ALL which disconnects intermediate line 38 from any external device. The program then proceeds to step 110 to check for a CALL DETECT signal from the ANI decoder 8. If no CALL DETECT is received, the program proceeds back to step 105. If a CALL DETECT is received, the program proceeds to check the decoded SOURCE telephone number from ANI signal in step 115. If the SOURCE is a number such as 305-555-1111 which corresponds to a predetermined number for lock out, the program proceeds to step 120 to check for a HANG UP signal from call answering device 22. If no HANG UP signal is received, the program loops back to step 120, thereby continuously checking for the HANG UP signal. If a HANG UP signal is received, the program proceeds back to step 105. In this operational sequence, the source telephone number causes the answering device to allow the telephone call to ring indefinitely, thus the answering device responds as if no answering device is present.

Referring back to step 115, if the SOURCE did not correspond to the phone number, the program proceeds to step 125 to check if the SOURCE corresponds to a phone number of 305-555-2222. If the SOURCE corresponds, then the controller instructs the answering device 22 to ANSWER the telephone call, step 130. Upon answering the telephone call, controller 10 instructs the answering device 22 to END the telephone call, step 135. Upon completion of step 135, the program proceeds back to step 105, the start of the flow chart. This operational sequence instructs the answering machine to effectively terminate a telephone call from 305555-222. wherein the call is answered and immediately hung up, thereby inhibiting or locking out any type of phone call from this number. This operational sequence may be directed to a source of nuisance telephone calls.

Referring back to step 125, if the SOURCE did not match, the program proceeds to step 140 to check if the SOURCE equals 202-XXX-XXXX, where "X" indicates a variable digit. In this event, only the area code of a phone number is specified, and the remainder of the phone number is a variable. In this event, all calls originating from area code 202 will proceed to step 145 where controller 10 instructs the answering device to ANSWER the telephone call. The controller then instructs message player 26 to PLAY 1 which causes the message player to play message one, step 150. Upon playing message one, the program proceeds to step 135 where the controller instructs the call answering device 22 to END the telephone call. The program proceeds back to the start. In the event that the telephone call originates from anywhere within area code 202, this operational sequence plays a predetermined message to the telephone caller and ends the call. This message may contain information pertinent to any expected calls originating from that area code.

Referring back to step 140, if the SOURCE does not equal the number specified, the program proceeds to step 155 to check if the SOURCE equals 305-555XXX, 3XXX, where "X" indicates a variable digit. The last three digits of the telephone number being variable may indicate a call from a certain trunk line belonging to a factory or large office complex. In this event, the program proceeds to step 160 wherein the controller instructs call answering device 22 to ANSWER the telephone call. The program then proceeds to step 165 at which controller 10 instructs message player 26 to PLAY 2 wherein message player plays a predetermined message two on the telephone line 4. Upon completion of message two, the controller instructs the record and playback device to RECORD, step 170, to record the message on the telephone line 4. Note that since switch one, 127, was closed in step 105 of the program, intermediate line 38 is connected to telephone line one 4, thereby allowing the record and playback device to record a message from telephone line 4.

Upon completion of recording the message, the program proceeds to step 175 at which controller 10 instructs the answering device to END the telephone call. The program then proceeds to step 180 at which controller 10 instructs the telephone dialer 28 to DIAL 555-1212, a predetermined phone number. At step 185, the program delays until a signal is returned from the record and playback device indicating whether the dial telephone call was busy, answered, or no answer. If the telephone dialer returns a BUSY or a NO ANSWER signal, the program proceeds back to step 175 to END the telephone call, whereupon the program proceeds to redial the telephone number, step 180, and then goes to step 185. This loop is continued until the telephone call is answered.

In step 185, when the record and playback device returns an ANSWER signal, the program proceeds to step 190 at which the controller instructs the record and playback device 30 to PLAY BACK the message previously recorded in step 170. Upon completion of playing back the record message, the program proceeds to step 135 at which the outgoing telephone call is ended. The program then proceeds back to step 105 where the process is restarted.

To summarize, this partial operational sequence beginning at step 155, in the event a telephone call is received from a source of 305-5553XXX, the telephone call is answered, a unique message for the set of numbers is played to the caller, and the caller recites a message which is recorded within the answering machine. The answering machine then ends the incoming call and attempts to dial a second phone number 555-1212, and upon successful answering of the dialed phone number, plays back the recorded message to the telephone number. Upon completion of the playback, the answering machine ends the call and restarts its answering sequence. It can be appreciated that the telephone number 555-1212 may be to a number of possible destinations including a paging terminal and ultimately a pager.

If in step 155 the SOURCE was not within the numbers specified, the program proceeds to step 200 to check if the SOURCE equals 305-555-4444. If the SOURCE matches, the program proceeds to step 205 at which the controller instructs the answering device 22 to ANSWER the telephone call. The controller then instructs message player 26 to PLAY 3, step 210. Playing message 3 plays a unique message particular to the source of step 200. The program then proceeds to step 215 at which controller 10 sends an OPEN 1 signal to switch one 27. In doing so, telephone line 4 is disconnected from intermediate line 38. The controller then sends a CONNECT A signal to switch two 32 in step 220. In doing so, intermediate line 38 is now connected through switch two to interface A, 40 and telephone line two 20. The controller then sends a DIAL 555-2323 signal to telephone dialer 28 in step 225. This causes the telephone number 555-2323 to be dialed on telephone line two. After dialing the phone number, the program proceeds to step 230 wherein the controller sends a CLOSE 1 signal to switch one. The switch one 27 and switch two 32 now allows for the connection between telephone line one and telephone line two, effectively transferring the calling telephone to the telephone number 555-2323. The program then proceeds to step 235 to wait for a HANG UP signal from call answering device 22. Upon detection of the HANG UP signal, the program proceeds to step 135 at which the telephone call is ended. The program then proceeds back to step 105 at which switch one is initialized to the closed position and switch two is reopened. To briefly summarize the partial operational sequence beginning at step 200, if the phone number was originated from a source of 305-555-4444, the call is transferred to a second phone number 555-2323 on a second telephone line, thereby allowing the incoming call to be connected transparently to a second telephone.

Referring back to step 200, if the SOURCE did not equal the number specified, the program proceeds to step 240 to check if the SOURCE equals 305-555-5555. If in step 240 the SOURCE matches, the program proceeds to step 245 at which controller 10 instructs the call answering device 22 to ANSWER the telephone call. The program then proceeds to step 250 at which the controller sends a signal to switch two 32 to CONNECT B, resulting in intermediate line 38 being connected to Interface B 42. The program then proceeds to step 255 at which the HANG UP DETECT signal is expected from call answering device 22. The connection is maintained until the HANG UP signal is detected. Upon detection of the HANG UP signal, the program proceeds back to step 135 at which the call is ended and the program then proceeds back to the start, step 105, where switch one and switch two are reinitialized. To summarize this partial operational sequence beginning at step 240, a call originating from 305-555-5555 is answered and immediately connected to an interface B 42 which eventually connects the telephone line to device B 44. This kind of interface is useful where device B is a personal computer and the SOURCE from step 240 is a call from another computer device. This operational sequence effectively directly connects the calling computer to another personal computer and the call is maintained until a HANG UP is detected.

Referring back to step 240, if the SOURCE did not match, the program proceeds to step 260, at which controller 10 instructs the call answering device 22 to ANSWER the call. The program then proceeds to step 265 at which controller 10 sends a PLAY 4 signal to message player 26, thereby causing message player 26 to play message 4 on the telephone line. The program then proceeds to step 270 at which controller 10 sends a RECORD signal to the record and playback device 30. Upon completion of recording the message, the program proceeds to step 135 where the phone call is ended and the program then proceeds back to step 105. To summarize this operational sequence beginning at step 260 which is performed on all non-specified source telephone numbers, the sequence causes the answering machine to answer the telephone call, play a unique predetermined message, and then record any message from the telephone call. After recording the message, the answering machine proceeds back to the start.

To summarize, FIGS. 4B and 4C show a plurality of possible operational sequences performed by the telephone answering device of the present invention. The operational sequences perform various operations on a telephone call where an operational sequence is selected from a plurality of predetermined operational sequences and the selection is based upon the source telephone number of the telephone call. It can be appreciated that numerous variations of the operational sequences described may be implemented with the elements described within the telephone answering machine thereby realizing various modifications to the operational sequences.

Additionally, it should be appreciated by those familiar with the art that both voice and data transmissions are possible on a telephone line, and the contents of any message may be voice or digital in nature. Therefore, not only may the telephone message be of voice or digital content, but the contents of messages stored in message player 26 and record and playback device 30 may also be voice or digital in nature. Since the telephone answering device operates upon a message independent of the content, the operations on a data message will be performed equally as well as if the message contained voice information.

Figure 5:
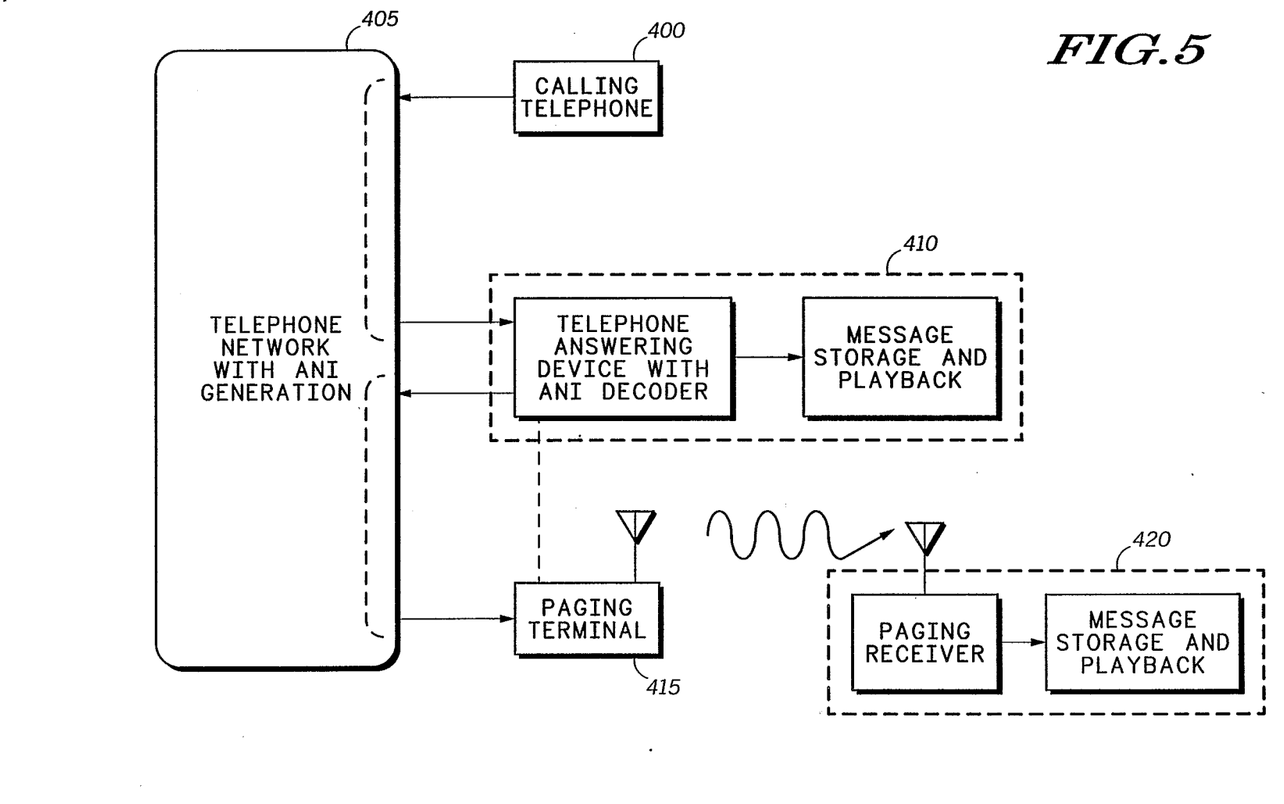
FIG. 5 is a block diagram illustrating a system comprising a telephone answering device and a paging system.

Referring now to FIG. 5, a block diagram for a system comprising a telephone answering device of the present invention and a paging system is illustrated. FIG. 5 shows a calling telephone 400 which corresponds to the source of the telephone call. The call enters into a telephone network 405 with automatic number generation. The automatic number identification automatically generates a signal indicative of the source telephone number. This signal is transmitted to an automatic telephone answering device 410 of the present invention when the telephone number of the device is dialed by the calling telephone. The telephone answering device 410 is functionally equivalent to the device shown in FIG. 2, and it contains an ANI decoder, message storage and playback functions as well as a plurality of other functions necessary to handle telephone messaging. In one implementation, the telephone answering device is capable of interfacing to a paging terminal 415 through telephone network 405. In this implementation, the paging terminal 415 may be one of several types, however, the Modax paging terminal manufactured by Motorola, Inc. is preferable. The interface from the telephone answering machine to the paging terminal may be through a 1 or 2 telephone line interface, a one telephone line interface allowing a message stored in the telephone answering device to be relayed to the paging terminal, and a two telephone line answering device being capable of connecting the message source with the paging terminal in which the operational sequence of either is dependent upon the source of the telephone call. The interconnection to such a paging terminal and the terminal's subsequent operation are well known in the art. As an example, the Motorola publication 68P81000B55 bearing the date 9/86 ; entitled "Modax 100 Installation and User's Guide" provides a detailed operational description of the paging terminal. Paging terminal 415 transmits to a paging receiver 420 which is capable of receiving and decoding paging signals modulated by the paging terminal in a radio frequency manner. The paging receiver also has the capability to store a message and to play back a message. An example of paging receiver 420 is described by U.S. patent application Ser. No. 07/068,682 to Bennett, et al. entitled "Digitized Stored Voice Paging Receiver" which is a continuation of U.S. Patent Application Serial No. 07/068,682, now abandoned. The continuation application 07/323,056 is assigned to the assignee of the present invention and is hereby incorporated by reference. In general, the paging terminal operation would be substantially the same for the incoming call, whether it is from an answering machine of the present invention or a prior art line caller.

In an alternate implementation for FIG. 5, the telephone answering device may be directly connected to a paging terminal, thereby eliminating the necessity for a second connection to the telephone network. The interface would be performed through an interface 46 and the paging terminal would be device 48 of FIG. 2. This implementation is shown by the broken line between answering device 410 and paging terminal 415 of FIG. 5. In this alternate implementation, the paging terminal could be a "People Finder" paging terminal manufactured by Motorola, Inc. The interfacing with and subsequent operation of such a paging terminal are well known in the art. As an example, the Motorola publication 68P81000B20 bearing the date 12/86 entitled "People Finder" On Site Communications System" provides a detailed operational description of the "People Finder" paging terminal. The operational sequence is similar to steps 240 through 255 of FIG. 4C for accessing the paging terminal. It can be appreciated that other operational sequences may exist that would allow access to the paging terminal 415, wherein the access is permitted based upon the source telephone number. Again, paging receiver 420 could be as previously described.

Answering machine 410 provides a device for limiting telephone message reception in a paging receiver by selectively directing the telephone message to paging transmitter, either directly or through the telephone network, and ultimately to the paging receiver. The message originates from message source or calling telephone 400, and telephone answering machine 410 determines the source of the message and, based on a predetermined set of operations, selectively forwards the message to the paging terminal 415. Pager 420 may then receive the message, but that reception is dependent upon the source of the message.

Similarly, since the telephone answering machine 410 is capable of storing messages and paging receiver 420 is also capable of storing messages, it is possible to selectively direct a message storage from a message source 400 to either telephone answering machine 410 message storage or paging receiver 420 message storage. Thus, messages may be distributed throughout the system. The storage decision is based upon the source telephone number of the message or calling telephone 400. This is accomplished through an operational sequence shown in FIG. 4B. Referring to steps 155 through 190 of FIG. 4B, the process is implemented on a single line telephone answering machine when the telephone number dialed by the telephone answering device of step 180 corresponds to a telephone number of the pager assigned by paging terminal 415. In this case, telephone answering machine will answer the telephone call, record a message, dial the paging telephone number 555-1212 and then play back the message to the paging terminal. The paging terminal subsequently transmits the message to the pager for storage. Similarly, on a two-line interface, the process is completed by steps 200 through 235. For example, if the phone number 555-2323 of step 225 corresponds to paging receiver 420's telephone number assigned by the paging terminal, the telephone call is received and answered, a connection is made through two-line interface to the telephone network 405 between the message source 400 and paging terminal 415. The message is directly transmitted to the paging terminal and ultimately to paging receiver 420 for storage.

Similarly, on a paging terminal directly connected to the telephone answering device, the process is described by steps 240 through 255. If the ANI determines that the call should be forwarded, the caller is directly connected to the paging terminal and a page is entered and then received by paging receiver 420 for storage.

Messages received by telephone answering machine 410 will not be directed to paging receiver 420 if the calling telephone number does not correspond to those of a predetermined origin as shown in FIG. 4C. This sequence is shown in steps 260 through 270 of FIG. 4C where a telephone message is recorded by the telephone answering device and the call is ended. The telephone message is not forwarded to the paging receiver 420 in this case. Thus, it has been shown that a message originating at a source 400 may be either directed to the message storage function of the telephone answering machine 410 or may be directed to the paging receiver 420 for storage with the decision based upon the source of the message. It can be appreciated that in a similar manner, a message may be played at either answering device 410 or paging receiver 420 if the message storage function is either inhibited or not present in the respective devices.

Although a preferred embodiment has been disclosed in detail, it should be understood that various changes, substitutions, and alterations may be made without departing from the spirit and scope of the claimed invention.

I claim:

1. Telephone answering apparatus for a subscriber of a paging system, said apparatus coupled to a telephone network for automatically receiving telephone calls including corresponding paging messages directed to said subscriber, such telephone calls including corresponding source identification signals generated by the telephone network to identify the telephone numbers of the corresponding sources of the telephone calls, said apparatus also coupled to a paging terminal of said paging system, said paging terminal operative to transmit paging messages to a portable paging receiver of said subscriber, said apparatus comprising:

means for storing a set of predetermined source identification codes;

means coupled to the telephone network for automatically receiving telephone calls directed to said subscriber and for decoding the source identification signals thereof to generate corresponding decoded source identification codes;

controller means coupled to said receiving means for selecting paging messages of the received telephone calls based on a correlation of the decoded source identification codes of said telephone calls with at least one of said stored set of predetermined source identification codes; and means for coupling to said paging terminal and governed by said controller means to direct said selected paging messages to said paging terminal for transmission to said subscriber's paging receiver.

2. The apparatus in claim 1 including means for making connection to the telephone network for coupling to the paging terminal.

3. The apparatus in claim 1 including second means for storing at least one paging message.

4. The apparatus in claim 3 including means for storing a second set of predetermined source identification codes; and wherein the controller means is operative to selectively store a paging message of a telephone call in the second means, the selection being dependent upon a correlation of the decoded source identification code of said telephone call with at least one of said stored second set of predetermined source identification codes.

5. The apparatus in claim 4 including means for forwarding the paging message stored in the second means to the paging terminal and ultimately to the paging receiver.

6. The system in claim 1 including means for storing another set of predetermined source identification codes; and wherein the controller means is operative to selectively terminate a telephone call, the selection being dependent upon a correlation of the decoded source identification code of said telephone call with at least one of said another set of predetermined source identification codes.

7. The apparatus in claim 1 wherein the storing means comprises a programmable storing means; and including a means for programming said programmable storing means with the predetermined source identification codes.

8. Apparatus for a paging terminal of a paging system, said apparatus coupled to a telephone network for automatically receiving telephone calls including corresponding paging messages directed to a subscriber of said paging system, such telephone calls including corresponding source identification signals generated by the telephone network to identify the telephone numbers of the corresponding sources of the telephone calls, said paging terminal operative to transmit paging messages to a portable paging receiver of said subscriber, said apparatus comprising:

means for storing a set of predetermined source identification codes corresponding to a subscriber of said paging system;

means coupled to the telephone network for automatically receiving said subscriber directed telephone calls and for decoding the source identification signals thereof to generate corresponding decoded source identification codes;

controller means coupled to said receiving means for selecting paging messages from the received telephone calls directed to said subscriber based on a correlation of the decoded source identification codes of said telephone calls with at least one of said subscriber's stored set of predetermined source identification codes; and     means responsive to said controller means to govern said paging terminal to transmit said selected paging messages of said subscriber to the portable paging receiver thereof.

9. The apparatus in claim 8 wherein the storing means comprises a programmable storing means; and including a means for programming said programmable storing means with the predetermined source identification codes.

10. The apparatus in claim 8 including second means for storing at least one paging message.

11. The apparatus in claim 10 including means for storing a second set of predetermined source identification codes corresponding to the subscriber; and wherein the controller means is operative to selectively store a paging message of a telephone call in the second means, the selection being dependent upon a correlation of the decoded source identification code of said telephone call with at least one of said stored second set of predetermined source identification codes.

12. The apparatus in claim 11 including means governing the paging terminal to transmit the paging message stored in the second means to the paging receiver of the subscriber.

13. The apparatus in claim 8 including means for storing another set of predetermined source identification codes; and wherein the controller means is operative to selectively terminate a telephone call, the selection being dependent upon a correlation of the decoded source identification code of said telephone call with at least one of said another set of predetermined source identification codes.

* * * * *